(12) United States Patent
Gorokhov et al.

(10) Patent No.: US 7,054,354 B2
(45) Date of Patent: *May 30, 2006

(54) MULTICARRIER TRANSMISSION SYSTEM WITH REDUCED COMPLEXITY LEAKAGE MATRIX MULTIPLICATION

(75) Inventors: Alexei Gorokhov, Eindhoven (NL); Johan Paul Marie Gerard Linnartz, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 796 days.

This patent is subject to a terminal disclaimer.

(21) Appl. No.: 10/078,952

(22) Filed: Feb. 19, 2002

(65) Prior Publication Data

US 2002/0146063 A1    Oct. 10, 2002

Related U.S. Application Data

(63) Continuation-in-part of application No. 09/959,015, filed on Oct. 15, 2001.

(30) Foreign Application Priority Data

Feb. 22, 2001    (EP)    ................................. 01200686

(51) Int. Cl.
*H04K 1/00*    (2006.01)
(52) U.S. Cl. .......................... 375/148; 375/229
(58) Field of Classification Search ................ 375/148, 375/223, 229, 316, 343, 346, 348, 350, 351; 455/296

See application file for complete search history.

(56) References Cited

U.S. PATENT DOCUMENTS

| | | | |
|---|---|---|---|
| 5,802,117 A * | 9/1998 | Ghosh | 375/344 |
| 6,240,099 B1 * | 5/2001 | Lim et al. | 370/441 |
| 6,252,908 B1 * | 6/2001 | Tore | 375/259 |
| 6,456,654 B1 * | 9/2002 | Ginesi et al. | 375/229 |
| 6,526,103 B1 * | 2/2003 | Li et al. | 375/316 |
| 6,654,408 B1 * | 11/2003 | Kadous et al. | 375/148 |
| 6,714,520 B1 * | 3/2004 | Okamura | 370/286 |
| 6,724,809 B1 * | 4/2004 | Reznik | 375/148 |
| 6,765,969 B1 * | 7/2004 | Vook et al. | 375/259 |

FOREIGN PATENT DOCUMENTS

WO    WO0163870    2/2001

OTHER PUBLICATIONS

"Equalization of PPT-leakage in mobile DVB-T", Master Thesis in Radiocommunication from the Royal Institute of Technology, Stockholm, by Guillaume Geslin, Apr. 1998, pp. 1-59.

* cited by examiner

Primary Examiner—Emmanuel Bayard
Assistant Examiner—Lawrence B. Williams (57) ABSTRACT

Described is a transmission system for transmitting a multicarrier signal from a transmitter (10) to a receiver (20). The multicarrier signal comprises a plurality of subcarriers. The receiver (20) comprises a channel estimator (28) for estimating amplitudes of the subcarriers and for estimating time derivatives of the amplitudes. The receiver (20) further comprises an equalizer (24) for canceling intercarrier interference included in the received multicarrier signal in dependence on the estimated amplitudes and derivates (29). The receiver (20) comprises a multiplication by a N×N leakage matrix, and wherein the multiplication is implemented as a sequence of an N-point IFFT (82), N pointwise multiplications (84) and an N-point FFT (86). multiplications (84) and an N-point FFT (86).

10 Claims, 4 Drawing Sheets

MULTICARRIER TRANSMISSION SYSTEM WITH REDUCED COMPLEXITY LEAKAGE MATRIX MULTIPLICATION

This is a continuation-in-part of application Ser. No. 09/959,015, filed Oct. 15, 2001, which is incorporated by reference.

The invention relates to a transmission system for transmitting a multicarrier signal from a transmitter to a receiver.

The invention further relates to a receiver for receiving a multicarrier signal from a transmitter.

Multicarrier modulation methods, such as OFDM and MC-CDMA, have been around for some time now. OFDM or Orthogonal Frequency Division Multiplexing is a modulation method designed in the 1970's in which multiple user symbols are transmitted in parallel using different subcarriers. These subcarriers have overlapping (sinc-shaped) spectra, nonetheless the signal waveforms are orthogonal. Compared to modulation methods such as BPSK, QPSK or MSK, OFDM transmits symbols which have a relatively long time duration, but a narrow bandwidth. Mostly, OFDM systems are designed such that each subcarrier is small enough in bandwidth to experience frequency-flat fading. This also ensures that the subcarriers remain orthogonal when received over a (moderately) frequency selective but time-invariant channel. If the OFDM signal is received over a such channel, each subcarrier experiences a different attenuation, but no dispersion.

The above mentioned properties of OFDM avoid the need for a tapped delay line equalizer and have been a prime motivation to use OFDM modulation methods in several standards, such as Digital Audio Broadcasting (DAB), the Digital Terrestrial Television Broadcast (DTTB) which is part of the Digital Video Broadcasting standard (DVB), and more recently the wireless local area network standard HIPERLAN/2. Particularly in the DAB and DTTB applications, mobile reception under disadvantageous channel conditions are foreseen, with both frequency and time dispersion. Mobile reception of television has not been regarded as a major market up to now. Nonetheless, the DVB system promises to become a high-speed delivery mechanism for mobile multimedia and internet services. At the IFA '99 Consumer Electronics trade show, a consortium of Nokia, Deutsche Telecom and ZDF demonstrated mobile web browsing, email access and television viewing over an OFDM DVB link, with a GSM return channel. With 8 k OFDM subcarriers, over the air DVB reception functioned properly for vehicle speeds upto 50 mph. Mobile reception, i.e. reception over channels with Doppler spreads and the corresponding time dispersion remains one of the problems associated with OFDM systems in particular and multicarrier transmission systems in general. Whereas its robustness against frequency selectivity is seen as an advantage of OFDM, the time-varying character of the channel is known to pose limits to the system performance. Time variations are known to corrupt the orthogonality of the OFDM subcarrier waveforms. In such a case, Intercarrier Interference (ICI, also referred to as FFT leakage) occurs because signal components from one subcarrier cause interference to other, mostly neighboring, subcarriers.

In the document "Equalization of FFT-leakage in mobile DVB-T", Master Thesis in Radiocommunication from the Royal Institute of Technology, Stockholm, by Guillaume Geslin, April 1998, a multicarrier transmission system is disclosed. In this known transmission system ICI is cancelled (i.e. detected and removed from the received multicarrier signal) in the receiver by means of an equalizer. This equalizer derives a vector of estimated symbols from a vector of received symbols. The operation of the equalizer is based upon a channel model in which the amplitudes of the subcarriers and the time derivatives thereof are indicative of the ICI. The receiver comprises a channel estimator which generates estimates of these amplitudes and derivatives and supplies these estimates to the equalizer. The equalizer then cancels the ICI in dependence on the estimates of the amplitudes and derivatives. The receiver in the known transmission system is relatively complex, i.e. a relatively large number of computations is needed to implement the channel estimator and the equalizer.

It is an object of the invention to provide a transmission system according to the preamble in which the computational burden is substantially reduced. This object is achieved in the transmission system according to the invention, said transmission system being arranged for transmitting a multicarrier signal from a transmitter to a receiver, the multicarrier signal comprising a plurality of subcarriers, the receiver comprising a channel estimator for estimating amplitudes of the subcarriers and for estimating time derivatives of the amplitudes, the receiver further comprising an equalizer for canceling intercarrier interference included in the received multicarrier signal in dependence on the estimated amplitudes and derivatives, wherein the receiver comprises a multiplication by N×N leakage matrix $\Xi$, and wherein the multiplication is implemented as a sequence of an N-point IFFT, N pointwise multiplications and an N-point FFT. The invention is based upon the recognition that the complexity of the multiplication by the leakage matrix $\Xi$, which is an operation that is used quite commonly in the context of ICI cancellation in multicarrier transmission systems, may be reduced due to the fact that the leakage matrix $\Xi$ is diagonalized by a Fourier basis, i.e. that $\Xi = F\Delta F^H$, where F is the N-point FFT matrix with normalized columns and $\Delta$ is a positive diagonal matrix. Hence, a multiplication by the N×N matrix $\Xi$ may be implemented as a sequence of an N-point IFFT, N pointwise multiplications and an N-point FFT, thereby substantially reducing complexity.

In an embodiment of the transmission system according to the invention the receiver is a decision feedback receiver and wherein the channel estimator comprises a smoothing filter for smoothing the estimated amplitudes and/or derivatives. Application of such a smoothing filter has the advantage that it exploits the correlation among derivatives. That is, since an estimate of a derivative on a particular subcarrier is inaccurate because of noise or other effects, it is useful take also into account the values of the derivative at neighboring subcarriers. In practice this typically means that one smoothes the values of subcarriers of the various subcarriers.

In a further embodiment of the transmission system according to the invention the FFT is further arranged for demodulating the received multicarrier signal. In this way the FFT may be used for demodution and as part of the multiplication of the leakage matrix.

The above object and features of the present invention will be more apparent from the following description of the preferred embodiments with reference to the drawings, wherein.

In the FIGS., identical parts are provided with the same reference numbers.

The invention is based upon the development of a simple and reliable channel representation. In order to do so, we will consider a multicarrier transmission system, e.g. an OFDM or MC-CDMA transmission system, with N subcarriers spaced by $f_s$. Each subcarrier has a rectangular envelope of a finite length that, including the cyclic extension, exceeds $(1/f_s)$. Let $s=[s_1, \ldots, s_N]^T$ be a vector of N transmitted symbols, then the transmitted continuous time baseband signal may be written as follows:

$$x(t) = \sum_{k=1}^{N} s_k \exp(i2\pi f_s k t). \qquad (1)$$

In the case of a frequency selective time-varying additive white Gaussian noise (AWGN) channel, the received continuous time signal may be written as follows:

$$y(t) = \sum_{k=1}^{N} s_k H_k(t) \exp(i2\pi f_s k t) + n(t), \qquad (2)$$

wherein the coefficient $H_k(t)$ represents the time-varying frequency response at the k-th subcarrier, for $1 \leq k \leq N$, and wherein $n(t)$ is AGWN within the signal bandwidth. We assume that the channel slowly varies so that only a first order variation may be taken into account within a single data block duration. In other words, we assume that every $H_k(t)$ is accurately approximated by $$H_k(t) \approx H_k(t_r) + H_k'(t_r)(t - t_r), \qquad (3)$$

wherein $H_k'(t)$ is the first order derivative of $H_k(t)$ and wherein $t_r$ is a reference time within the received data block. Note that the time varying channel $H_k(t)$ may also take into account a residual frequency offset, after the coarse frequency synchronization.

The received baseband signal is sampled with a sampling offset $t_o$ and a rate $Nf_s$ and a block of its N subsequent samples $[y(t_o), y(t_o+T), \ldots, y(t_o+(N-1)T)]$ $$\left(\text{with } T = \frac{1}{Nf_s}\right)$$

is subject to a fast fourier transform (FFT) of size N. Let $y=[y_1, \ldots, y_N]^T$ be the vector of N FFT samples so that $$y_k = \frac{1}{N} \sum_{n=0}^{N-1} y(t_o + nT) \exp(-i2\pi k n/N). \qquad (4)$$

After substituting (2) into (4) and using the approximation (3), we obtain $$y_k = a_k s_k + \sum_{l=0}^{N-1} d_l s_l \sum_{n=0}^{N-1} (n/N) \exp(-i2\pi(k-l)n/N) + n_k, \qquad (5)$$

$$a_l = \exp(i2\pi f_s l t_0)(H_l(t_r) + H_l'(t_r)(t_0 - t_r)), \qquad (6)$$

$$d_l = \exp(i2\pi f_s l t_0) T H_l'(t_r), \qquad (7)$$

wherein $n_k$, for $1 \leq k \leq N$, are the samples of AWGN having a certain variance $\sigma^2$. It is convenient to rewrite the result (5) in a close matrix form. To this end, we define diagonal matrices $A=\text{diag}\{a_1, \ldots, a_N\}$, $D=\text{diag}\{d_1, \ldots, d_N\}$ and an N×N matrix $$\Xi = \{\Xi_{p,q}\}_{p,q=1}^{N}, \Xi_{p,q} = \sum_{n=0}^{N-1} (n/N) \exp(-i2\pi(p-q)n/N). \qquad (8)$$

With this notation, the expression (5) is equivalent to $$y = As + \Xi Ds + n, \qquad (9)$$

wherein $n=[n_1, \ldots, n_N]^T$ is an N×1 vector of AWGN. In the channel model (9), the effect of the channel is represented by two sets of N parameters $a=[a_1, \ldots, a_N]^T$ and $d=[d_1, \ldots, d_N]^T$. Check that $H_l(t_r) + H_l'(t_r)(t_0 - t_r) \approx H_l(t_o)$, hence the coefficients $a_k$, for $1 \leq k \leq N$, are equal to the complex amplitudes of the channel frequency response rotated by the sampling phase $\exp(i2\pi f_s l t_0)$. Similarly, the coefficients $d_k$, for $1 \leq k \leq N$, are equal to the time-domain derivatives of the complex amplitudes of the channel frequency response scaled by the sampling period T and rotated by the same sampling phase $\exp(i2\pi f_s l t_0)$.

Note that an inter-carrier interference occurs when the channel response varies in time (i.e. $d \neq 0$). This interference is defined by the vector d as well as the fixed N×N matrix $\Xi$. It can be is easily seen that according to (8) the latter matrix is a Toeplitz Hermitian matrix and that $$\Xi = \{\Xi_{p,q}\}_{p,q=1}^{N}, \Xi_{p,q} = \begin{cases} (N-1)/2, & p = q; \\ -(1 - e^{i2\pi(q-p)/N})^{-1}, & p \neq q. \end{cases}$$

Later in this document, we will call a the (vector of) amplitudes, d the (vector of) derivatives and $\Xi$ the leakage matrix. In the above expression, the values on the diagonal of $\Xi$ depend on the (arbitrary) choice of the reference time instant to, and can therefor vary depending on the embodiment of receiver. Typical choices for to are time beginning, the end or middle of a frame window. For to chosen near the middle of the frame, the diagonal terms tend to become approximately zero.

For the implementation of a receiver based on the principles discussed here, multiplication by $\Xi$ may be prohibitively complicated particularly for large N (many subcarriers). One can of course only use the terms near the diagonal and exploit the Toeplitz character of $\Xi$ by implementing it as a delay-line filter. But there are more efficient implementations of $\Xi$. We note that the first-order ICI terms result from amplitudes linearly increasing with time. That is, one can implement Ξ as the cascade of 1. an I-FFT operation (to go back from a frequency domain representation of the subcarriers to time domain),
2. a multiplication of the resulting time-domain signal by a diagonal matrix, i.e., a weighting of each component by a scalar. In its basic form the weighting is y a linearly increasing function, but in practice one may divert from this, for instance to jointly optimize the reduction of ICI and the avoidance of noise enhancements.
3. an FFT operation to return to the frequency domain representation in which subcarrier signals are typically processed.

This allows the implementation of Ξ with a complexity NlogN, instead of $N^2$ multiplications. The inverse of Ξ can be implemented with this structure. For the inverse the terms on the diagonal of the matrix of step 2 will approximately be of the form or $n/(c+n^2)$, where n is the index at the output number of the I-FFT. We will exploit this in several receiver embodiments to be given later. In a practical implementation, it is useful to use the same hardware circuit for the FFT and IFFT used for Ξ as the hardware used for the main FFT operation to retrieve subcarrier signals.

To process the received signal, the set of channel parameters a and d should be estimated. The estimation accuracy of these 2N scalar parameters may be enhanced if the statistical properties of the channel are used. First of all, we assume that channel variations are slow enough so that $H_k'(t)$ do not change substantially within the duration of a symbol. In this case, we may rewrite (6) and (7) as follows:

$$a_l \approx \exp(i2\pi f_s l t_o) H_l(t_o),$$

$$d_l \approx \exp(i2\pi f_s l t_o) T H_l'(t_o), 1 \leq l \leq N. \quad (10)$$

Let us analyze the relationship between the quantities a, d and physical parameters of the propagation channel, namely the set of its K propagation delays $\{\tau_0, \ldots, \tau_K\}$, the corresponding Doppler shifts $\{f_0, \ldots, f_K\}$, and complex amplitudes $\{h_0, \ldots, h_K\}$. Note that the statistical properties of the channel frequency response depend on the relative delays and Doppler shifts whereas the group delay and/or Doppler shift result in rotations of $h_k$, for $1 \leq k \leq K$, where the rotations are taken care of by time and carrier synchronization/tracking. Hence, we may assume without loss of generality that $\tau_0 = 0$ and $f_0 = 0$. Now, the channel frequency response $H_l$ and its derivative $H_l'$ may be written as follows:

$$H_l(t) = \sum_{n=0}^{N} h_n \exp(i2\pi(f_n t - f_s l \tau_n)), \quad (11)$$

$$H_l'(t) = i2\pi \sum_{n=0}^{K} f_n h_n \exp(i2\pi(f_n t - f_s l \tau_n)), \ 1 \leq l \leq N.$$

The relationships (10) and (11) may be readily used to deduce the statistical properties of the amplitudes a and derivatives d. Whenever the number of propagation paths is big enough (ideally K>>N), the set of coefficients $\{H_l(t), H_l'(t)\}_{1 \leq l \leq N}$ may be considered jointly Gaussian distributed. Moreover, one can show that the sets $\{H_l(t)\}_{1 \leq l \leq N}$ and $\{H_l'(t)\}_{1 \leq l \leq N}$ are mutually uncorrelated when $\{h_k\}_{1 \leq k \leq K}$ are uncorrelated and the Doppler spectrum has a symmetric shape. In this case, the vectors a and d may be assumed statistically independent multivariate Gaussian with zero mean and covariance matrices $$E\{aa^H\} = C_a, E\{dd^H\} = C_d \quad (12)$$

where $E\{.\}$ stands for the mathematical expectation operator and $C_a$, $C_d$ are N×N Hermitian non-negative definite matrices.

An important particular case of $C_a$, $C_d$ corresponds to a standard model for mobile channels, as described in the book Microwave Mobile Communications by C. Jakes, John Wiley & Sons, Inc., 1974. This model (known as Jakes model) assumes independent contributions of different propagation paths, an exponential delay profile and uniformly distributed angles of incidence for different paths. One can show that in this case, $$C_a = C, C_d = \gamma^2 C, \gamma^2 = \frac{1}{2}(2\pi f_\Delta T)^2, \quad (13)$$

$$C_{pq} = \frac{1}{1 + i2\pi(p-q)f_s T_\Delta}, 1 \leq p, q \leq N,$$

wherein $f_\Delta$ is the magnitude of the Doppler spread and wherein $T_\Delta$ is the root mean square propagation delay spread. The last two parameters depend on the mobile velocity and propagation environment respectively.

Although the outlined channel model is characterized by 2N parameters, the number of independent degrees of freedom is substantially smaller in practice. This property comes from the fact that the propagation delay spread is often much smaller than the word duration. This property also means that the entries of a are strongly correlated, to the extend that the covariance matrix $C_a$ may be accurately approximated by a low-rank matrix. Similarly, the entries of d are strongly correlated and the covariance matrix $C_d$ may also be accurately approximated by a low-rank matrix. Let us consider the Jakes model and therefore (13). Define the eigendecomposition of C:

$$C = U \Lambda U^H, \quad (14)$$

wherein U is the N×N unitary matrix of eigenvectors of C and wherein Λ is the N×N positive diagonal matrix of its eigenvalues $\{\Lambda_1, \ldots, \Lambda_N\}$. Assume that the eigenvalues are ordered so that sequence of $\{\Lambda_1, \ldots, \Lambda_N\}$ is non-increasing. Under Jakes model, the elements of this sequence have an exponentially decaying profile:

$$\Lambda_k \sim \exp(-f_s T_\Delta k), \text{for } 1 \leq k \leq N. \quad (15)$$

Hence, the sequence of eigenvalues may be accurately approximated with a relatively small number r of non-zero values:

$$\{\Lambda_1, \ldots, \Lambda_N\} \approx \{\Lambda_1, \ldots, \Lambda_r, 0 \ldots 0\}. \quad (16)$$

The aforementioned properties of the channel parameters (i.e. amplitudes and derivatives) can be extensively used to derive reduced complexity procedures for channel equalization with ICI removal. Evidently, in situations where the statistical channel may divert from the idealized theoretical situation, theses models may still inspire the design of practical receiver. The mismatch between the actual channel and the idealized channel model may lead to a (small) performance penalty. However, this does not mean that the receiver principles disclosed in this invention, can not be used successfully.

Figure 1:
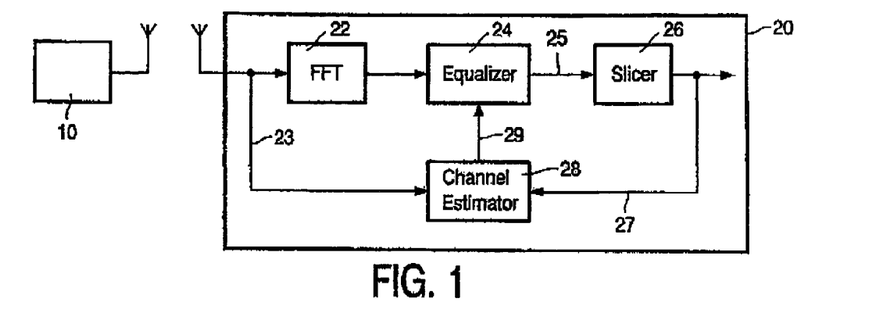
FIG. 1 shows a block diagram of a transmission system according to the invention.

FIG. 1 shows a block diagram of a transmission system according to the invention. The transmission system comprises a transmitter 10 and a receiver 20. The transmission system may comprise further transmitters 10 and receivers 20. The transmitter 10 transmits a multicarrier signal via a wireless channel to the receiver 20. The multicarrier signal may be an OFDM signal or a MC-CDMA signal. The receiver 20 comprises a demodulator 22 for demodulating the received multicarrier signal, which received multicarrier signal comprises vectors of received symbols. The demodulator 22 may be implemented by means of a FFT. The demodulated multicarrier signal is supplied by the demodulator 22 to an equalizer 24. The equalizer 24 cancels intercarrier interference which may be included in the received multicarrier signal. The equalizer 24 outputs vectors of estimated symbols 25 (which have been derived from the vectors of received symbols) to a (soft) slicer 26. The slicer 26 produces soft metrics (soft decisions) and/or binary estimates (hard decisions) of the (coded) bits to be used in the further signal processing parts of the receiver (which are not shown), e.g. a FEC decoder. The output signal of the slicer 26 may also be regarded as comprising estimated symbols 27. The receiver 20 further comprises a channel estimator 28 for estimating amplitudes 29 of the subcarriers and for estimating time derivatives 29 of the amplitudes. The equalizer 24 cancels the intercarrier interference included in the received multicarrier signal in dependence on the estimated amplitudes and derivatives 29 which are supplied by the channel estimator 28 to the equalizer 24. The channel estimator 28 may comprise a reduced complexity filter for deriving vectors of the estimated amplitudes and derivatives 29 from the vectors of received symbols 23 and vectors of estimated symbols 27.

We now continue with an example embodiment of a receiver based on the developed channel model. If an OFDM receiver is extended such that it can not only reliably estimate amplitudes $\hat{a}$ (as conventional receivers do), but also (complex valued, e.g. including phase information) derivatives $\hat{d}$ (which is not common for normal OFDM receivers), then the user data can be recovered as follows:

create the matrix $Q=\hat{a}+\Xi\hat{d}$, with $\hat{a}$ and $\hat{d}$ denoting the estimates of amplitudes and derivatives, respectively. Note that the receiver receives the signal $y=Qs+n$ (according to (9)).

Then estimate s as $\hat{s}=Q'y$.

Such a receiver is called a linear receiver. The receiver 20 as shown in FIG. 1 may be regarded as such a linear receiver when the equalizer 24 implements the matrix multiplication $Q'y$. Here $Q'$ plays the role of an inverse of Q. At least two approaches come to mind. In a zero-forcing approach, $Q'$ is the strict algebraic inverse of Q. In an MMSE setting $Q'$ is chosen to ensure that $\hat{s}=Q'y=E s|y$, i.e. the conditional expectation of s given y. This typically minimizes the mean square error $\|\hat{s}-s\|^2$. In a zero-forcing receiver, the ICI is effectively cancelled but noise is amplified. This can lead to undesirable results. The MMSE receiver optimizes the joint strength of noise and residual ICI. This receiver requires an adaptive (typically real-time) inversion of a matrix which depends on the instantaneous channel characteristics $\hat{a}$ and $\hat{d}$.

It is also possible to use a so-called decision feedback receiver. The channel model presented earlier in this document reveals that one can refine and improve this decision feedback receiver in several aspects, among them:

A feedback loop in which the estimates of the derivatives are more accurate if one exploits more knowledge about the statistical behavior of these derivatives, in particular correlation.

A feedback loop in which the error correction code is used with in the loop. As a side note we mention that for multi-carrier CDMA, the spreading code plays an identical role as the error correction code. That is, one can place the decoding (whether is occurs as CDMA despreading, as error correction decoding, or any other form) within the loop.

Figure 2:
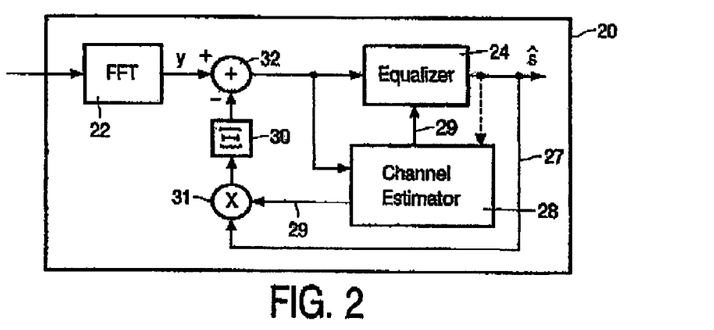
FIGS. 2 and 3 and 5 and 6 show block diagrams of embodiments of decision feedback receivers according to the invention.

FIG. 2 shows a block diagram of an embodiment of a decision feedback receiver. The decision feedback receiver 20 comprises a demodulator 22 for demodulating the received multicarrier signal, which received multicarrier signal comprises vectors of received symbols. The demodulator 22 may be implemented by means of a FFT. The demodulated multicarrier signal is supplied by the demodulator 22 to a subtracter 32. The subtracter 32 subtracts an estimation of the ICI included in the received multicarrier signal from the demodulated multicarrier signal. The resulting 'ICI-free' signal is supplied to an equalizer 24 for normal equalization of the signal and to a channel estimator 28. The equalizer 24 may also comprise a slicer. The equalizer 24 operates in dependence on estimated amplitudes which are supplied to the equalizer 24 by the channel estimator 28. The output signal of the equalizer 24, comprising vectors of estimated symbols, is supplied to a multiplier 31. Furthermore, the output signal of the equalizer 24 is also supplied to further signal processing parts of the receiver (which are not shown). The channel estimator 28 estimates the amplitudes and time-derivatives of the subcarriers. The estimated amplitudes 29 are supplied to the equalizer 24 and the estimated derivatives 29 are supplied to the multiplier 31. The multiplier 31 multiplies the estimated derivatives and the estimated data symbols and supplies the resulting signal to a filter 30 which implements the leakage matrix $\Xi$. The filtered signal which is an estimate of the ICI is then supplied to the subtracter 32.

Figure 3:
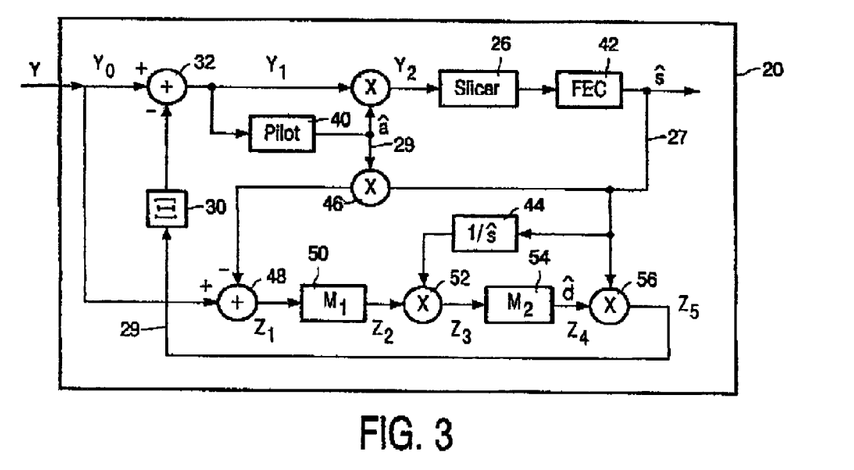

Based on this general scheme another decision feedback receiver can be devised as illustrated in FIG. 3. Here, the FFT demodulator is not shown (but is thought to be present). The signal path comprising $Y_0$, $Y_1$, $Y_2$, the slicer 26, the forward error control decoding 42 and the channel estimation (whether blind or pilot based) are similar to the design of a conventional, state-of-the-art OFDM receiver. In the receiver described here, we introduced a subtraction of the estimated ICI ($\Xi Z_5$), using $Y_1=Y_0-\Xi Z_5$. Here $Z_5$ is an estimation of the modulated derivatives $\hat{d}s$. The signal path $Z_1$, $Z_2$, $Z_3$, $Z_4$ estimates the derivatives of the amplitudes, with $Z_4=\hat{d}$. The rationale behind the circuit is that $Z_1$ recovers the ICI, because an estimate of the modulated subcarriers is subtracted from $Y_0$. Only noise, ICI and an estimation error remain. Filter 50 is used to estimate the modulated derivatives from the ICI. It inverts the leakage matrix $\Xi$, though not necessarily as the inverse in strict mathematical sense. Preferable this is done while avoiding excessive noise enhancement or enhancement of estimation error. Modulation of the derivatives is removed in the step $Z_2 \rightarrow Z_3$. Filter 54 exploits the correlation between the subcarrier derivatives, to generate a better estimate $Z_4$. A useful implementation of $\Xi$ involves the cascaded use of an (Inverse) FFT, a multiplication (with a diagonal matrix) and an FFT.

Although the circuit is depicted as hardware building blocks, a typical implementation may involve iterative software processing. We experimented with an iteration method comprised of the following steps for iteration round i:
- Input: observation $Y_0$, as well as the (i−1)-th estimate of amplitudes $â(i−1)$, derivatives $d̂(i−1)$, and data $ŝ(i−1)$. Here values between brackets denote the number of the iteration round.
- Calculation of $Y_1(i)$, using previous estimates of derivatives $d̂(i−1)$ and data $ŝ(i−1)$, using $Y_1(i)=Y−\Xi(d̂(i−1)ŝ(i−1))$
- New estimate amplitudes $â(i)$ from $Y_1(i)$, and (not depicted) possibly exploiting knowledge of amplitudes and derivatives in the previous frame.
- New estimate of data $ŝ(i)$
- Calculation of $Z_1(i)$, $Z_2(i)$, $Z_3(i)$, $Z_4(i)$, $Z_5(i)$,
- (Optional step, not depicted in the FIG.) possible use of knowledge of amplitudes and derivatives in the previous frame. This step involves operations which exploit correlation among subcarrier derivatives.
- Output: new estimate of amplitudes $â(i)$, derivatives $d̂(i)$, and data $ŝ(i)$ Starting condition is the all-zero vector for $â(0)$, $d̂(0)$ and $ŝ(0)$.

The filter 50 attempts to recover an estimate of d s from Z, by filtering $Z_2=M_1Z_1$. One mathematical approach is to use the orthogonality principle for an MMSE estimate. In this case, an appropriate choice for $M_1$ follows from the requirement $E[(Z_2−ds) Z_1^H]=0_N$. We define e as the vector of decision errors, with $e=as−âŝ$. This gives $M_1=\{E[ds(ds)^H]\Xi^H+E[dse^H]\}[E[\Xi ds(ds)^H \Xi^H+I_N\sigma_n^2+ee^H+\Xi dse^H+(ds)^H\Xi^H e]]^{−1}$, wherein $\sigma_n$ is the variance of the noise. Modeling and (pre-)calculating some of the statistical expectation values here can be done, but may not be practical for receiver designers. So next we will search for simplifying approximations.

One can simplify the resulting $M_1$ as $M_1=\Xi^H[\Xi\Xi^H+G]^{−1}$, wherein G is empirically determined as $G=c_1I_N$ with a constant $c_1$ which may be adapted to specific propagation environments, for instance the average BER, the average SNR or the speed of the mobile receiver.

$Z_3$ approximates $d̂$, however it contains error contributions due to AWGN and estimation error in $d̂$ and $ŝ$. Here we can exploit statistical knowledge that we have developed about the channel behavior, e.g. on correlation of derivatives. The circuit from $Z_2$, multiplication by $1/x$, $Z_3$, $M_2$, $Z_4$ to multiplier $Z_5$ is intended to perform this task. The multiplications aim at removing and reinserting the data modulated onto the signal. A smoothing operation $M_2$ occurs in between. An MMSE filter to estimate $Z_4$ as closely approximating $d̂$ follows from the orthogonality principle $E(Z_4−d̂)Z_3^H=0_N$, thus $M_2=Ed̂Z_3^H[EZ_3Z_3^H]^{−1}$. In practice one may find it acceptable to crudely approximate $M_2=Ed̂d̂^H[Ed̂d̂^H+R_3]^{−1}$. Experiments revealed that $R_3=c_2I_N$ with a constant $c_2$ is a workable solution.

Figure 4:
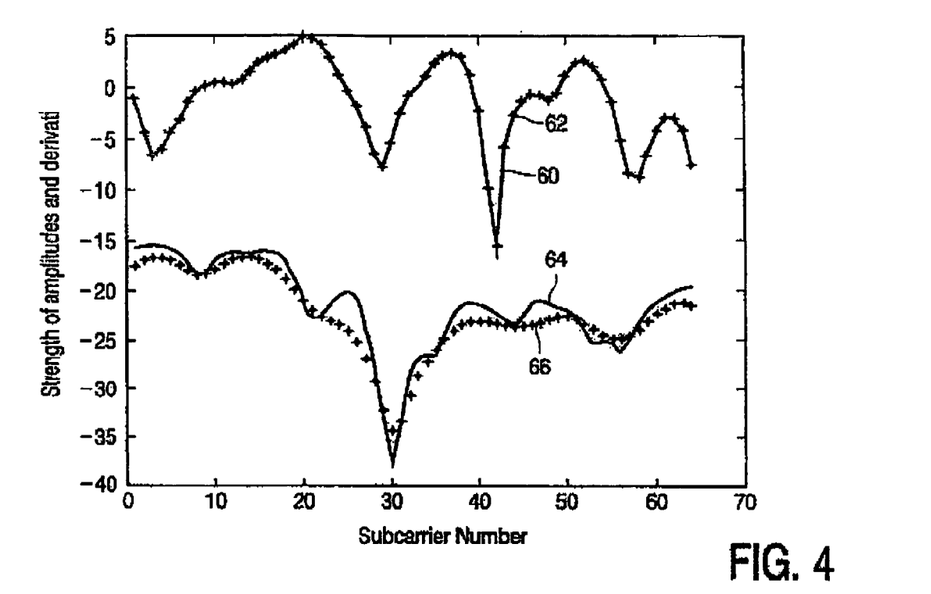
FIG. 4 shows some graphs illustrating the performance of the decision feedback receiver as shown in FIG. 3.

FIG. 4 shows some graphs illustrating the performance of the decision feedback receiver as shown in FIG. 3. The strength of the amplitudes and the derivatives (in dB) is plotted against the subcarrier number. Graph 60 shows the strength of the actual amplitudes, while graph 62 shows the strength of the estimated amplitudes. Graph 64 shows the strength of the actual derivatives, while graph 66 shows the strength of the estimated derivatives. It can be seen that the amplitudes are estimated very well by the decision feedback receiver of FIG. 3, while the estimated derivatives deviate somewhat from the actual derivatives.

Figure 5:
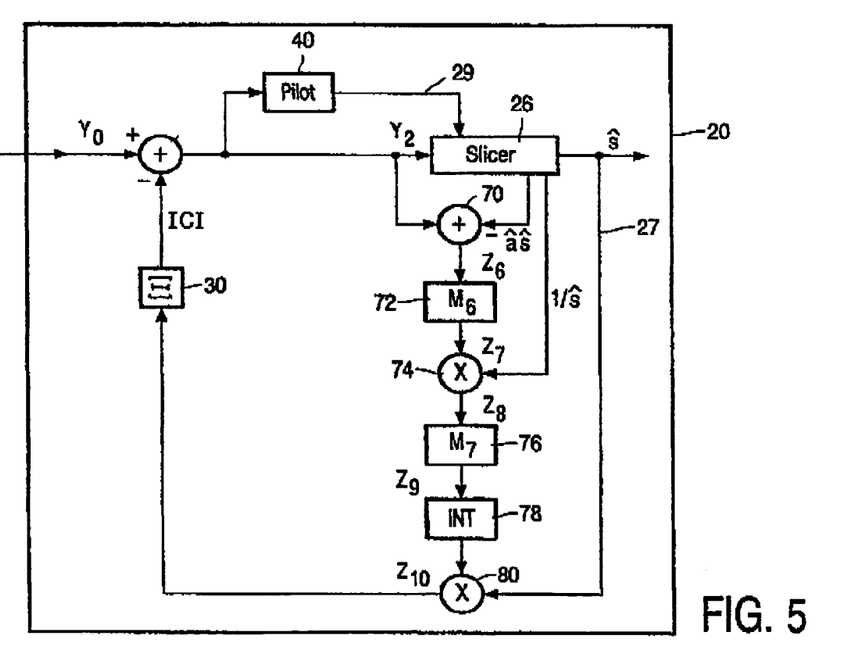

FIG. 5 shows another decision feedback receiver based on a MMSE structure. It allows iterative computing to minimize the variance of the error between input and output of the slicer. The slicer box, as used in FIG. 5 may or may not include error correction decoding. The slicer outputs the estimate of the data $ŝ$, as well as $1/ŝ$ and $âŝ$. For OFDM with QAM modulation, $1/ŝ$ typically is found from a look-up table. Iterative software processing can also used in the receiver of FIG. 5. The iteration method contains the following steps for iteration round i:
- Input: observation $Y_0$, as well, as the (i−1)-th estimate of amplitudes $â(i−1)$, derivatives $d̂(i−1)$, and data $ŝ(i−1)$
- Calculation of $Y_2(i)$, using previous estimates of derivatives $d̂(i−1)$ and data $ŝ(i−1)$, using $Y_2(i)=y−\Xi(d̂(i−1)ŝ(i−1))$
- Newly estimate amplitudes $â(i)$ from $Y_2(i)$, and (not depicted) possibly exploiting knowledge of amplitudes and derivatives in the previous frame.
- Newly estimate data $ŝ(i)$, and the corresponding values of $1/ŝ(i)$ (e.g. table look-up), and $â(i) ŝ(i)$
- Calculation of $Z_6(i)$, $Z_7(i)$, $Z_8(i)$, $Z_9(i)$. Here $Z_9(i)$ acts as (correction of) the estimate $d̂$.
- Integration of $Z_9(i)$ over various rounds, for instance $d̂(i)=\alpha d̂(i−1)+(1−\alpha Z_9(i))$
- (not depicted) use knowledge of amplitudes and derivatives in the previous frame.
- Output: new estimate of amplitudes $â(i)$, derivatives $d̂(i)$, and data $ŝ(i)$ Starting condition is the all-zero vector for $â(0)$, $d̂(0)$ and $ŝ(0)$.

One can take the filters 72 and 76 non-adaptive and identical to $M_6=M_1$ and $M_7=M_2$ of FIG. 3, respectively. A practical value for the integration constant can be $\alpha=0.9$, so $d̂(i)=0.9d̂(i−1)+0.1Z_9(i)$.

Figure 6:
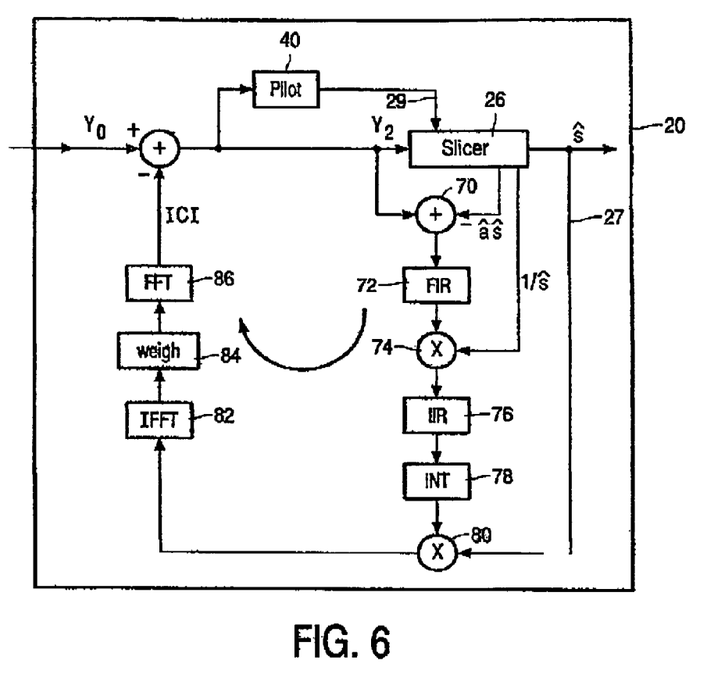

It appears that several implementations refines are possible as are shown in FIG. 6. Here, the inverse of $\Xi$ is implemented as a Finite Impulse Response FIR filter. The second filter $M_7$ is implemented as an IIR smoothing filter. Lastly, an FFT—weighting—FFT filter is applied to create an estimate of the ICI.

Many further improvements are foreseen: Use of amplitude and derivatives of previous frames to better estimate the amplitude and derivative. This can be done either as indicated as 'optional step' in the algorithms, or taking the initial condition of the iteration as an extrapolation of results from the previous OFDM frame, with $â(0)$ for the new frame equals $â$(final) plus $Td̂(0)$, the latter corrected from the duration of any cyclic prefix or guard interval.

The filters in the receiver, in particular $M_1$, $M_2$, $M_6$, $M_7$ may in a practical receiver be fixed or be chosen from a library of precomputed values. For instance, the receiver control system may upon its knowledge of the propagation environment choose between optimized settings for stationary reception (in which most of the ICI cancellation is switched of), slow mobile reception (some ICI cancellation), or fast mobile reception (aggressive ICI cancellation).

Furthermore, adaptive filters could be used. These can use reliability information about estimates. This can be achieved by adaptive matrices or identification of erasures in the estimates.

Figure 7:
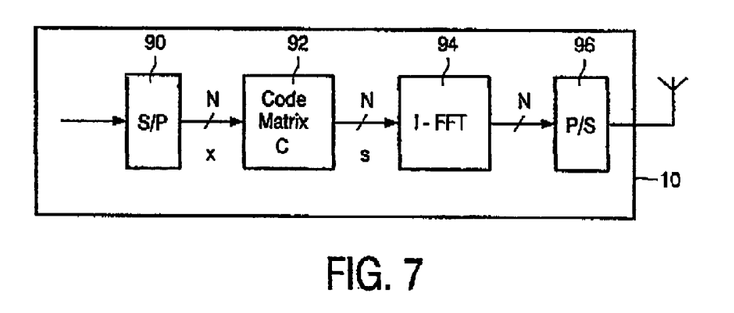
FIG. 7 shows a block diagram of a MC-CDMA transmitter.

MC-CDMA is an extension of the basic OFDM principle. In 1993, this form of Orthogonal Multi-Carrier CDMA was proposed. Basically, it applies OFDM-type of transmission to a multi-user synchronous DS-CDMA signal. So it is vulnerable to Doppler. As illustrated in FIG. 7, we use the following vector notation. For OFDM, vector s of length N carries a 'frame' of user data, with $s=[s_0, s_1, \ldots s_{N−1}]^T$, where the elements $s_n$ are user symbols. In MC-CDMA, $s=Cx$, where C is an N×N code matrix and $x=[x_0, x_1, \ldots x^{N−1}]^T$ represents a frame of user data. We will refer to x as N user signals, without explicitly identifying whether or not all symbols come from the same end-user. The k-th column of C represents the 'spreading code' of user data stream k, and will be denoted as $(c_k[0], \ldots c_k[N-1])^T$. A commonly used special case, which we will also consider here, is $C = N^{-1/2} WH_N$ where $WH_N$ is the Walsh-Hadamard matrix of size N×N. In that case, $C = C^{-1} = C^H$, so $CC = I_N$ wherein $I_N$ is the N×N unit matrix. In another special case, namely that of $C = I_N$, the MC-CDMA system reduces to OFDM. For ease of analysis, we normalize the modulation as $E[x_i x_j]^* = \delta_{ij}$, or equivalently $E[xx^H] = I_N$. Then $E[ss^H] = EC[xx^H]C^H = CC^H = I$.

FIG. 7 illustrates such a MC-CDMA transmitter. Frames are created by a serial-to-parallel (S/P) conversion of an incoming stream of data by a serial-to-parallel converter 90, applying the code spreading by a spreader 92, an I-FFT 94 and a parallel-to-serial conversion 96 with prefix insertion. We will address the transmission of a single frame, and assume that interframe interference is avoided by choosing appropriate guard intervals. Hence, the elements of vectors s and x are constant with time. The frame duration, excluding any guard interval is $T_s$, where $\omega_s T_s = 2\pi$.

Figure 8:
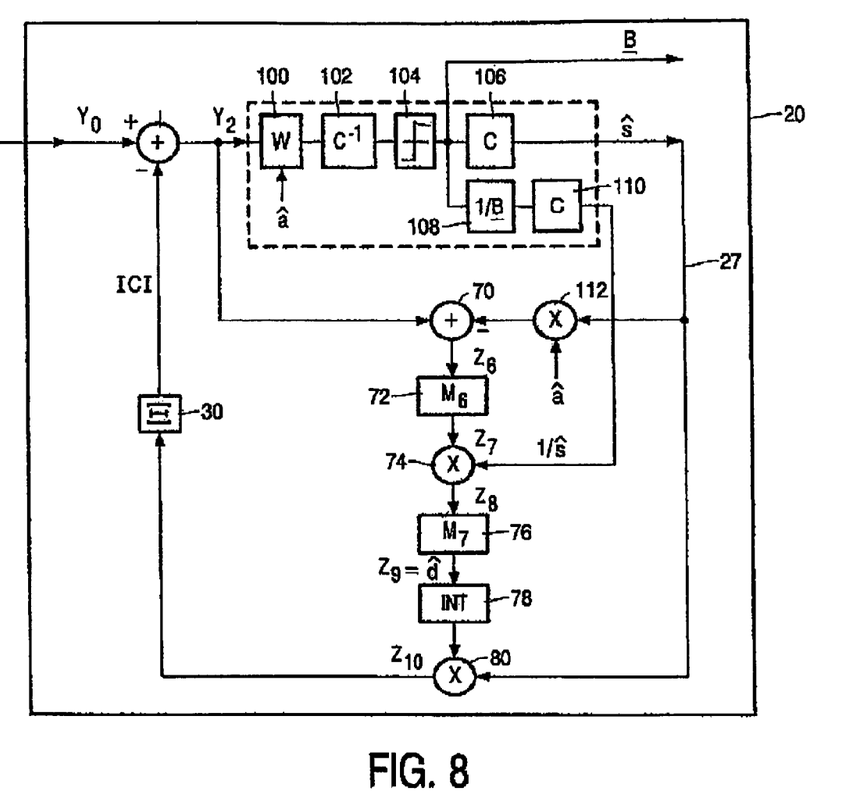
FIG. 8 shows a block diagram of an embodiment of a MC-CDMA decision feedback receiver according to the invention.

If the receiver architectures proposed in the previous sections are used for MC-CDMA, basically, the FEC is replaced by the (inverse) code matrix C. The receiver depicted in FIG. 5 is an extension of the receiver of FIG. 5 to accommodate MC-CDMA instead of OFDM. The difference with the OFDM receiver resides in the box drawn with the dashed line. For OFDM this basically contains a gain control and a slicer. For MC-CDMA, we added in the code spreading matrix C (which is used in the spreaders 106 and 110 and the despreader 102). The receiver is designed such that all matrixes are fixed (or taken from a library of pre-computed values) and that no divisions are necessary. An exception is the weight matrix W (used in the filter 100), which has channel adaptive settings.

It can be shown that in an MMSE setting, W only has non-zero components on the diagonal, with $$w_{n,m} = \frac{\delta_{n,m} a_n^*}{a_n a_n^* + \text{constant}}$$

wherein the constant depends on the noise floor. Details of the circuitry to estimate amplitudes are not shown in FIG. 8, but can be based on known principles.

For MC-CDMA, the slicer bases its symbol decisions on energy received from all subcarriers, thus the reliability of estimates ŝ is much more accurate in subcarriers that are in a fade.

The principles of the receivers described above can also be combined with an FFT which handles more samples than the usual size FFT. One example is the use of a fractionally spaced FFT, another one is the double sized FFT. Moreover, one can even design a system that separates components received via amplitudes from those received over derivatives.

Although in the above mainly an OFDM transmission system is described, the invention is also and equally well applicable to other multicarrier transmission systems such as MC-CDMA transmission systems. Large part of the receivers may be implemented by means of digital hardware or by means of software which is executed by a digital signal processor or by a general purpose microprocessor.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. A transmission system for transmitting a multicarrier signal from a transmitter to a receiver, the multicarrier signal comprising a plurality of subcarriers, the receiver comprising;
   a channel estimator for estimating amplitudes of the subcarriers and for estimating time derivatives of the amplitudes:
   an equalizer for canceling intercarrier interference included in the received multicarrier signal in dependence on the estimated amplitudes and derivatives, comprising a multiplication by N×N leakage matrix, and wherein the multiplication is implemented as a sequence of an N-point IFFT, N pointwise multiplications and an N-point FFT.

2. The transmission system according to claim 1, wherein the receiver is a decision feedback receiver and wherein the channel estimator comprises a smoothing filter for smoothing the estimated amplitudes and/or derivatives.

3. The transmission system according to claim 1, wherein the FFT is further arranged for demodulating the received multicarrier signal.

4. The transmission system according to claim 1, wherein the multicarrier signal is an OFDM signal.

5. The transmission system according to claim 1, wherein the multicarrier signal is a MC-CDMA signal.

6. A receiver for receiving a multicarrier signal from a transmitter, the multicarrier signal comprising a plurality of subcarriers, the receiver comprising:
   a channel estimator for estimating amplitudes of the subcarriers and for estimating time derivatives of the amplitudes, and
   an equalizer for canceling intercarrier interference included in the received multicarrier signal in dependence on the estimated amplitudes and derivatives, comprising a multiplication by N×N leakage matrix-, and wherein the multiplication is implemented as a sequence of an N-point IFFT, N pointwise multiplications and an N-point FFT.

7. The receiver according to claim 6, wherein the receiver is a decision feedback receiver and wherein the channel estimator comprises a smoothing filter for smoothing the estimated amplitudes and/or derivatives.

8. The receiver according to claim 6, wherein the FFT is further arranged for demodulating the received multicarrier signal.

9. The receiver according to claim 6, wherein the multicarrier signal is an OFDM signal.

10. The receiver according to claim 6, wherein the multicarrier signal is a MC-CDMA signal.

* * * * *